May 12, 1970          E. L. GEORGE          3,511,216
ANIMAL WORK STANCHIONS
Filed Jan. 29, 1968                              2 Sheets-Sheet 2
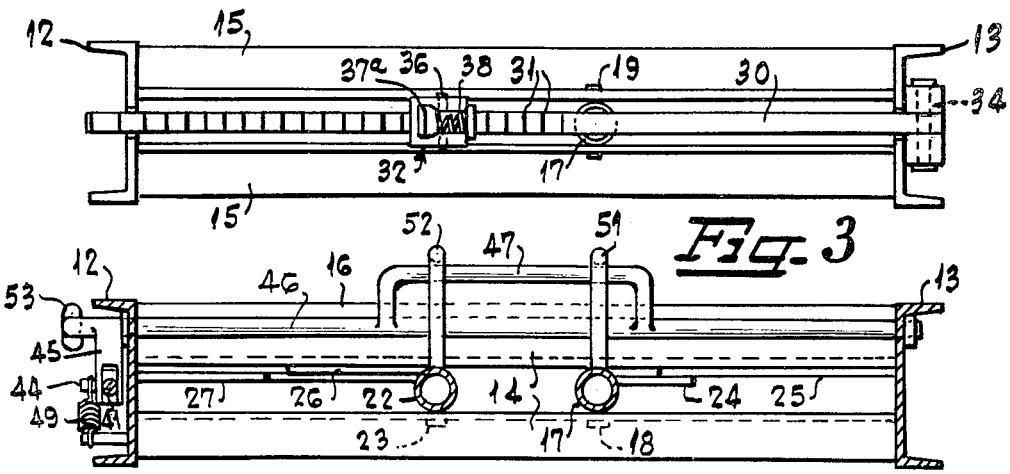
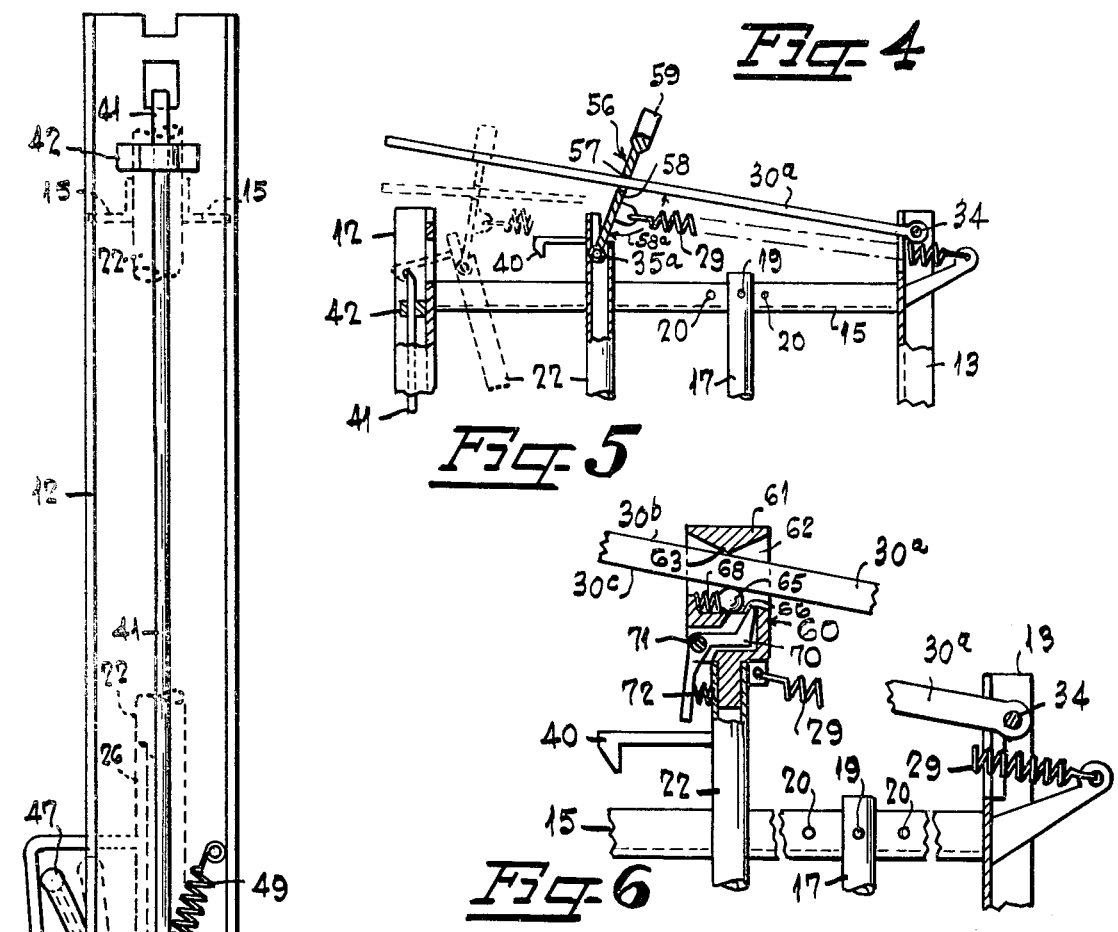
INVENTOR:
ELTON L. GEORGE
BY Robert Brown Jr.
ATTORNEY

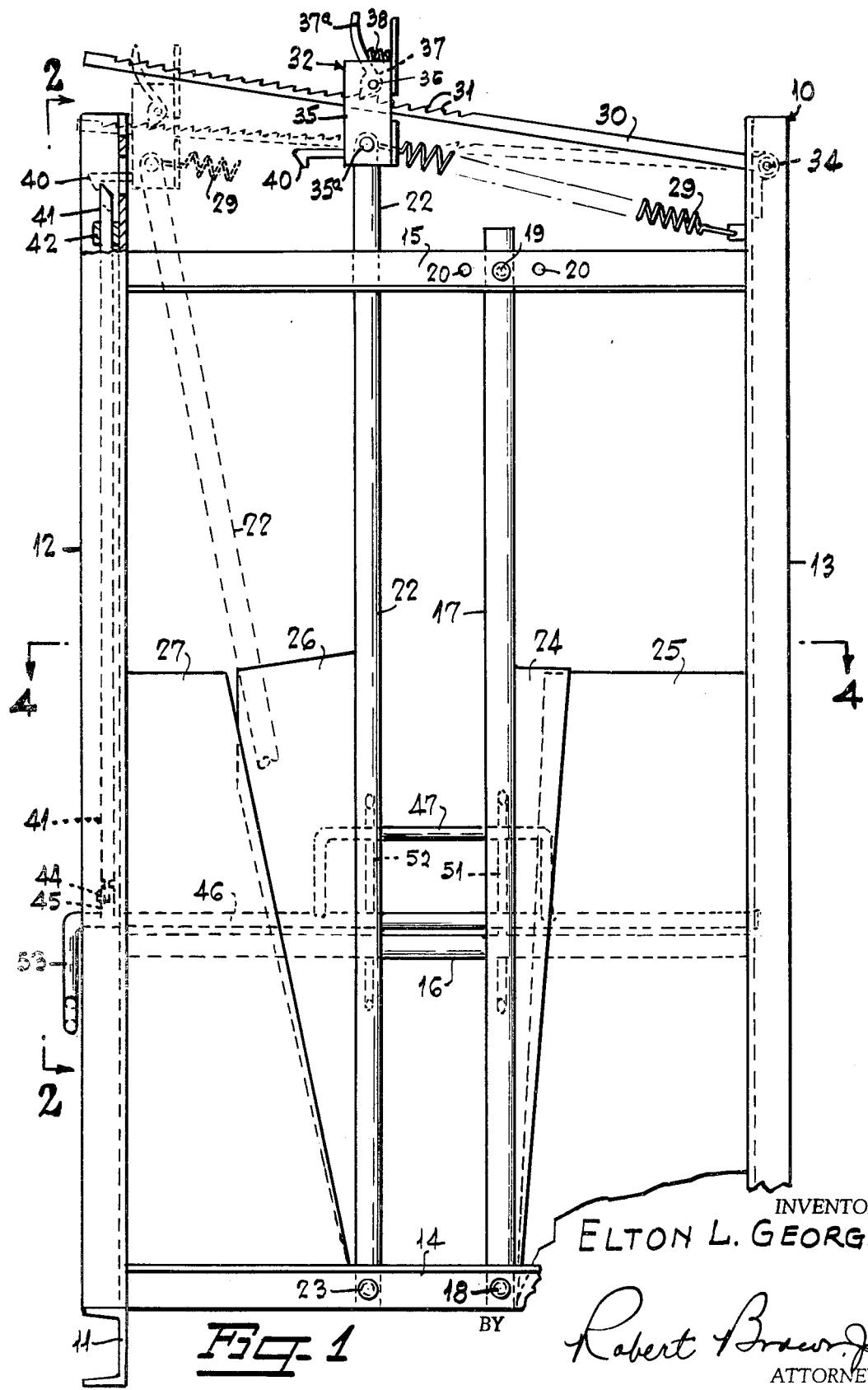

United States Patent Office 3,511,216
Patented May 12, 1970

3,511,216
ANIMAL WORK STANCHIONS
Elton L. George, Rte. 1, East, Danville, Ark. 72833
Filed Jan. 29, 1968, Ser. No. 701,389
Int. Cl. A61d 3/00; A01k 1/00
U.S. Cl. 119—147
9 Claims

ABSTRACT OF THE DISCLOSURE

A stanchion composed of a frame, and two upright bars between which an animal's neck may be releasably held, one of the bars being pivoted at its lower end to the frame and having its upper free end rotatable away from and biased for rotation toward the other bar, in combination with an adjustable strut connecting the free bar end to the frame. Specifically, the strut comprises a control bar pivoted to the frame and mounted upon and movable relative to the free bar end. The bar cooperates with a mechanism for releasably holding the free bar end in a rearward cocked position, and also with a one-way releasable mechanism for automatically preventing the free bar end from rotating rearwardly from any forward position.

---

This invention relates to animal work stanchions and more particularly to a novel construction for automatically clamping and locking an upright stanchion bar against the necks of the animals and in spaced positions relative to a cooperating stanchion bar.

The nature of the work performed with stanchions of the class described requires a sturdy construction to withstand the animal's strength, a neck clamping mechanism which entraps the animal quickly, quietly and without injury, and a safety mechanism for preventing accidental release of the animal while held in clamped position. Prior art devices purporting to meet such requirements generally employ complex, bulky construction which usually results in high first cost, frequent maintenance, and inefficient operation.

It is an object of this invention to provide a stanchion which overcomes the above disadvantages of prior art devices.

The invention comprises a pair of upright stanchion bars, one of which is normally biased by a spring for movement toward the other. Specifically, the invention is characterized by a strut comprising a control bar which forms a part of a latching mechanism for holding the biased bar in a rearward cocked position, and which also forms a part of a one-way clutch mechanism which releasably locks the biased bar against rearward rotation from any of its forward positions. By employing a common control bar for these functions, and in the manner as set forth below, a higher operation efficiency is obtained with a reduced number of parts.

Some of the objects of invention having been stated, other objects will appear as the description proceeds when taken in connection with the accompanying drawings, in which—

FIG. 1 is an elevational view of one embodiment of a stanchion according to my invention;

FIG. 2 is an elevational view along line 2—2 in FIG. 1;

FIG. 3 is a top plan view of FIG. 1;

FIG. 4 is a sectional plan view along line 4—4 in FIG. 1;

FIG. 5 is an elevational view, similar to the upper portion of FIG. 1, but showing a modified form of the invention; and FIG. 6 is a fragmentary detail view, with parts thereof in section, showing another modified form of the invention.

Referring more specifically to the drawings, the numeral 10 denotes a stanchion framework comprising base 11, spaced upright channel members 12 and 13, lower transversely extending angle members 14, 14, upper transversely extending angle members 15, 15, and intermediate transversely extending pipe 16.

An upright stanchion bar 17 is fixedly secured at its lower end as at 18 between members 14, 14, the upper end of said bar being similarly secured between members 15, 15 as at 19. Suitable spaced holes 20 are provided in members 15, 15 to permit the upper end of bar 17 to be adjusted to different inclined positions relative to the vertical and to properly accommodate one side of the animal's neck as it is held thereagainst above the pipe 16 by means of a second upright stanchion bar 22 on the opposite side of the animal's neck. Bar 22 has its lower end disposed between and pivotally secured to members 14, 14 as at 23, the upper end portion of said bar being disposed between angle members 15, 15 and swingable forwardly toward and rearwardly from fixed bar 17.

The lower portion of the space between upright members 17 and 13 is closed by overlapping plates 24 and 25, which plates have the remote vertical edges thereof respectively secured to said upright members. Similarly, the lower portion of the space between members 22 and 12 is closed by overlapping plates 26 and 27 secured to the latter members.

Stanchion bar 22 is normally biased for rotation about pivot 23 and forwardly toward fixed bar 17 by means of a tension spring 29, one end of the spring being secured to the upper free end of bar 22 and the other end to channel member 13 (FIG. 1).

During use of the stanchion, an animal is caused to insert its head and neck into the opening above the pipe 16 and between upright stanchion bars 17 and 22, at which time, the spring 29 clamps the latter bar 22 against the inserted neck which, in turn, is pressed against fixed bar 17. It is evident, however, that the bar 22 must be held in a rearward cocked position during the positioning of the animal's neck between the bars 17 and 22 (FIG. 1). The cocking mechanism will be described later in detail.

A one-way mechanism is employed to hold the free end of bar 22 in a forward position corresponding to the neck thickness of the animal. Although different types of one-way mechanisms may be employed as herinafter disclosed, the type disclosed in FIGS. 1–4 includes a pawl and ratchet. The one-way pawl and ratchet mechanism is associated with a strut assembly 32 having one end thereof pivotally connected to the upper free end of bar 22 as at 35a and its other end pivotally secured to channel 13 as at 34. Specifically, the assembly comprises a bar 30 pivoted as at 34 and an intersection bar or bracket 35 pivoted as at 35a, the bracket 35 being forwardly movable upon bar 30 and lockable in each forward position by ratchet teeth 31 and pawl 37. Pawl 37 has an upwardly extending release handle 37a normally biased by a spring 38 to cause the lower end of the pawl to releasably engage teeth 31 at all times. As described below, the bar 30 serves as a control lever in combination with above described one-way means and also as a control lever in combination with the cocking and release mechanism for the swingable bar 22.

Bar 22 is held in dotted line cocked position as shown in FIG. 1 by means of a hook 40 and the upper end of a latch bar 41, the latter bar being slidably mounted in a bracket 42 on channel 12 as well as pivotally secured as at 44 to the end of a lever arm 45 extending horizontally from trip shaft 46. Trip shaft 46 is mounted for oscillation upon upright channel members 12 and 13 at an elevation slightly above the pipe strut 16, and is adapted to support a trip plate 47 in the path of movement of the animal's breast as the latter moves its head and neck toward the observer in FIG. 1 and between the cocked bar 22 and fixed bar 17. A spring 49 (FIG. 2) normally urges the latch bar 41 upwardly and the trip plate in a counter-clockwise direction against guard bars or rails 51 and 52; however, pressure of the animal's breast upon the trip plate will rotate shaft 46 in a clockwise direction to unlatch the control bar 30 and permit upright stanchion bar 22 to move forwardly to clamping position such as shown in bold lines in FIG. 1. The bars or rails 51 and 52 are secured to stanchion bars 17 and 22 respectively. A lever 53 extends downwardly from the end of trip shaft 46 and may be employed when it is desired to manually unlatch bar 41 from hook 40.

In FIG. 5, a modified form of strut is shown between pivot points 34 and 35a, which strut is in the form of a toggle joint assembly 56 embodying a one-way clamping mechanism. One leg of assembly 56 consists of a smooth control bar 30a pivoted as at 34 and having its free end slidably penetrating a slightly larger opening 57 in a second leg 58 of the assembly, the latter leg being normally positioned at an obtuse angle 58a relative to leg 30a and having its lower end pivotally secured as at 35a.

Rearward pressure upon the upper end of bar 22 will increase the obtuse angle 58a between members 30a and 58 to thereby cause the member or control bar 30a to be instantly clamped within opening 57 and prevent rearward rotation of the bar 22.

A handle 59, integral with the upper portion of leg 58, may be rotated slightly in a counterclockwise direction about pivot 35a to release the strip of opening 57 upon bar 30a, at which time, the assembly 56 and the attached bar 22 may be moved rearwardly to cocked dotted line position.

FIG. 6 shows another modified form of invention in which the strut connecting pivot 34 to the upper free end of bar 22 includes a control bar 30a and an intersecting one-way roller clutch assembly 60, said assembly being freely slidable forwardly upon the bar 30a and lockable in position in response to rearward pressure upon the upper end of stanchion bar 22.

Assembly 60 comprises a bracket 61 having an opening 62 therein which is penetrated by control lever 30a. A downwardly extending projection 63 of bracket 61 is slidably engaged by the top surface 30b of lever 30a, and at the same time an opposing ball or roller 65 engages the lower surface 30c of the control lever, thereby forming an adjustable knee or pivot. Ball 65 is rollably mounted in a guideway 66 disposed beneath and at an acute angle to lever surface 30c, said ball being yieldingly urged between the converging faces of guideway 66 and surface 30c by a spring 68. Thus, rearward pressure upon bar 22 will instantly lock assembly 60 to control lever 30a and prevent backward movement of the stanchion bar.

Manual release of ball 65 from between the convergent surfaces may be effected by means of release lever 70 pivoted to bracket 61 as at 71 and normally held in the retracted position shown in FIG. 6 by compression spring 72.

Preferred embodiments of the invention have been illustrated in the drawings and specific terms employed in the specification to describe them. Any such specific illustrations and terms, however, are used in a generic sense and not for purposes of limitation, the scope of invention being defined in the following claims.

I claim:

1. In animal work stanchion having a frame and a pair of upright bars between which the animal's neck is held, the lower end of one of said bars being pivotally secured to said frame and having its upper free end rotatable forwardly toward and rearwardly from said other bar, the combination of: a strut for joining said upper free bar end to a fixed point on said frame; means for automatically varying the effective length of said strut with the movement of said free bar end toward said other bar; and a one-way means engageable with said strut and responsive to rearward pressure upon said free bar end for locking the pivoted bar against rotation, said strut including a toggle joint consisting of a third and a fourth bar pivotally connected respectively at said point and to said upper free bar end, the free ends of said two last-named bars intersecting at an obtuse angle, and said length varying means including means for slidably mounting one of said two last-named bars upon the other at said intersection.

2. In an animal work stanchion having a frame and a pair of upright bars between which the animal's neck is held, the lower end of one of said bars being pivotally secured to said frame and having its upper free end rotatable forwardly toward and rearwardly from said other bar, the combination of: a strut for joining said upper free bar end to a fixed point on said frame; means for automatically varying the effective length of said strut with the movement of said free bar end toward said other bar; and a one-way means engageable with said strut and responsive to rearward pressure upon said free bar end for locking the pivoted bar against rotation, said one-way means comprising a surface extending longitudinally of said strut, a lever pivotally secured to said upper free end of said pivoted bar, and clamping means on the free end portion of said lever, said clamping means being engageable with said surface to lock said pivoted bar against rearward rotation.

3. A cattle work stanchion as defined in claim 1 and further comprising spring means normally biasing the upper free end portion of said pivoted bar toward its forward position, and means engageable with the free end of one of said toggle bars for releasably latching said free upright bar end in rearward position.

4. In an animal work stanchion having a frame and a pair of upright bars between which the animal's neck is held, the lower end of one of said bars being pivotally secured to said frame and having its upper free end rotatable forwardly toward and rearwardly from said other bar, the combination of: a strut for joining said upper free bar end to a fixed point on said frame; means for automatically varying the effective length of said strut with the movement of said free bar end toward said other bar; and a one-way means engageable with said strut end and responsive to rearward pressure upon said free end for locking the pivoted bar against rotation, said strut including a third bar extending from said fixed point and a fourth bar pivoted to the free end of said pivoted upright bar, the free end of one of the two last-named bars being slidably mounted longitudinally of the other, and said one-way means including ratchet teeth on one of the two last-named bars and a pawl on the other.

5. A cattle work stanchion as defined in claim 4 and further comprising spring means normally biasing the free end portion of said pivoted upright bar toward its forward position, and means connectible substantially at the junction of said third and fourth bars for releasably latching said pivoted upright bar in rearward position.

6. In an animal work stanchion having a frame and a pair of upright bars between which the animal's neck is held, the lower end of one of said bars being pivotally secured to said frame and having its upper free end rotatable forwardly toward and rearwardly from said other bar, the combination of: a strut for joining said upper free bar end to a fixed point on said frame; means for automatically varying the effective length of said strut with the movement of said free bar end toward said other bar; and one-way means engageable with said strut and responsive to rearward pressure upon said free bar end for locking the pivoted bar against rotation, said strut including a third bar pivoted at said fixed point and having the free end thereof slidably mounted on the free end of said pivoted upright bar, and said one-way means including a body rollably engaging a surface on said third bar, and cam means for guiding said body along a path extending at an acute angle to said surface.

7. A cattle work stanchion as defined in claim 6 and further comprising spring means normally biasing the free end portion of said upright pivoted bar toward its forward position, and means opposing said spring means for releasably latching the upright pivoted bar in rearward position.

8. An animal work stanchion as defined in claim 6 and further comprising manually operable means engageable with said body to disengage said one-way means.

9. In an animal work stanchion having a frame and a pair of upright bars between which the animal's neck is held, the lower end of one of said bars being pivotally secured to said frame and having its upper free end portion rotatable rearwardly away from and biased for forward rotation toward said other bar, the combination of a lever having one end thereof pivotally secured to said frame, means including said lever for latching the free end portion of said biased bar in rearward cocked position, means for releasing said latching means to permit the cocked bar to rotate forwardly, and a second means including said lever and responsive to rearward pressure upon said free bar end for locking the last-named bar in forward position and against rearward rotation.

References Cited

UNITED STATES PATENTS

| | | | |
|---|---|---|---|
| 497,163 | 5/1893 | Boman et al. | 119—99 |
| 581,175 | 4/1897 | Runnells et al. | 119—99 |
| 3,084,669 | 4/1963 | May | 119—98 |

HUGH R. CHAMBLEE, Primary Examiner